Dec. 3, 1929.                    J. C. MEYERS                    1,738,110
                                CHILD'S VEHICLE
                              Filed April 9, 1928
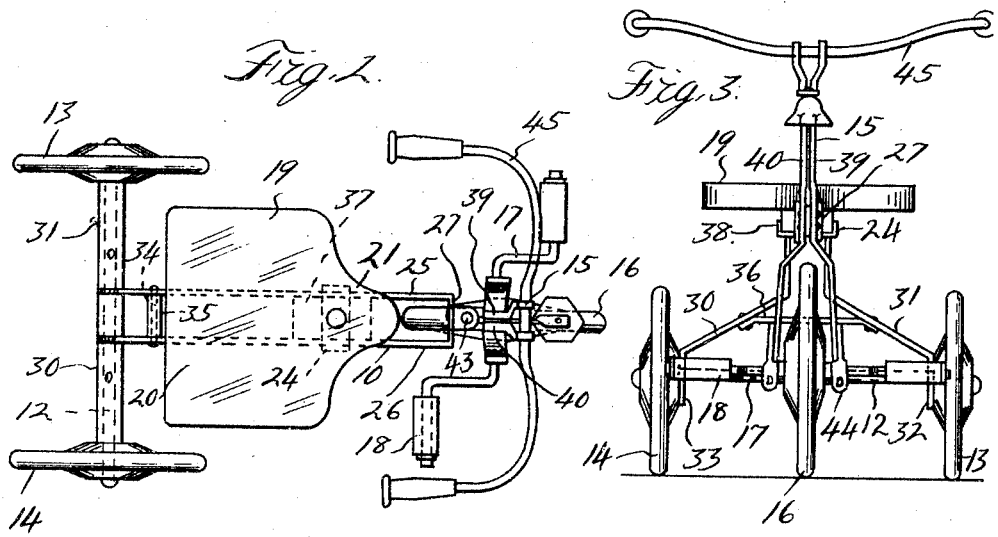
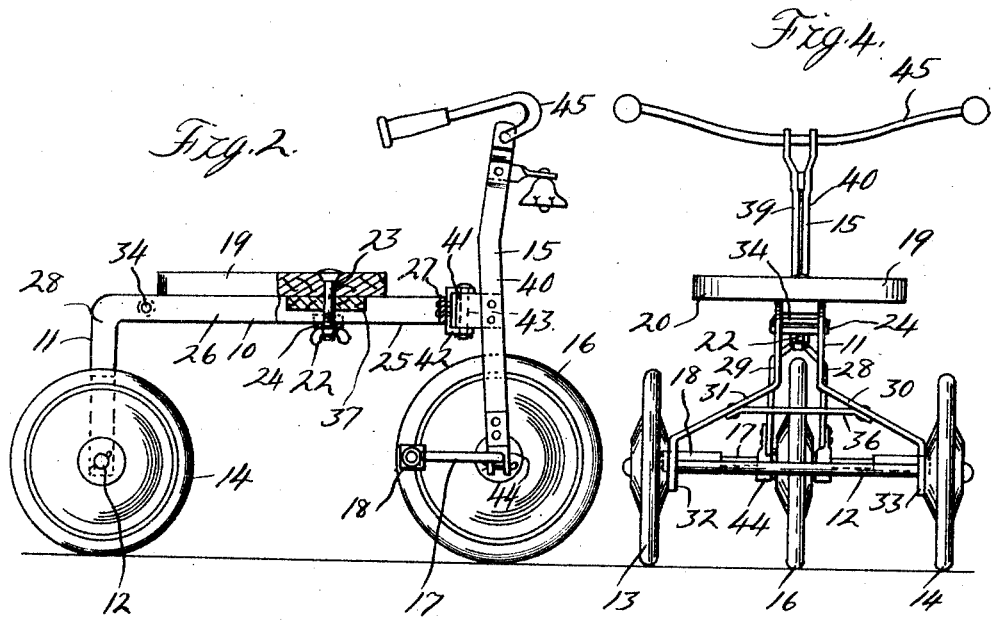
Inventor
James C. Meyers
By Whittemore, Hulbert & Whittemore & Belknap
                                                    Attorneys Patented Dec. 3, 1929

1,738,110

UNITED STATES PATENT OFFICE

JAMES C. MEYERS, OF TOLEDO, OHIO, ASSIGNOR TO THE GENDRON WHEEL COMPANY, OF TOLEDO, OHIO, A CORPORATION OF OHIO

CHILD'S VEHICLE

Application filed April 9, 1928. Serial No. 268,751.

The invention relates to improvements in child's vehicles, particularly of the type adapted for use by small children.

The primary object of the invention is to provide a construction of three wheeled vehicle which can be adjusted according to the size of the child so that the pedals and handle bars of the vehicle will be at the most convenient distance. With this object in view I have provided the novel construction hereinafter set forth and illustrated in the accompanying drawings, wherein Figure 1 is a plan view of the vehicle;

Figure 2 is a side elevation thereof partly in section;

Figure 3 is front view; and.

Figure 4 is a rear view.

In the preferred embodiment of the invention, the vehicle comprises a horizontally extending frame 10 having a downwardly extending portion 11 mounted on a rear axle 12. 13 and 14 are the rear wheels journaled on the rear axle. At the forward end of the frame 10 there is a wheeled steering frame 15 in which is mounted the front wheel 16. This wheel is provided with the crank arm 17 on which are arranged the pedals 18.

The horizontal frame 10 has slidably mounted thereon the flat seat 19 which as shown has the comparatively wide rear portion 20 forming the seat proper and the narrowed forwardly extending portion 21. The horizontal frame 10 is of substantially greater length than the seat 19 so that the latter may be adjusted longitudinally thereon toward or away from the pedals 18. Suitable clamping means is provided for normally maintaining the seat in adjusted position, which as shown comprises the wing nut 22 threadedly engaging the vertical bolt 23 which in turn extends downwardly through the seat 19 below the frame 10 and through the clamping member 24. With the construction as thus far described, it will be observed that the vehicle is capable of being adjusted according to the size of the child so that the seat 19 will be spaced at the proper distance from the pedals 18.

Referring now to the more specific construction as illustrated in the drawings, it is preferable to make the frame 10 of a single piece of strip metal return bent to form the laterally spaced horizontal bars 25 and 26 integrally connected at the forward end by the portion 27. The bars 25 and 26 are preferably of rectangular cross section and are extended in a substantially horizontal plane to a point in substantial vertical alignment with the rear axle 12. At this point the bars 25 and 26 are bent downwardly as indicated at 28 and 29, the distance between the bars being maintained substantially the same as that between the horizontal portions 25 and 26. After extending downwardly for a suitable distance the portions 28 and 29 are inclined downwardly and outwardly as indicated at 30 and 31 until just inside of the wheels 13 and 14 where they are again bent into vertical portions 32 and 33. These last mentioned portions are apertured for engaging the rear axle 12. The bars 25 and 26 are maintained in proper spaced relationship by means of the connecting pin 34 which passes through a tubular spacer 35. There is also provided a bracing member 36 between the oppositely inclined strips 30 and 31.

The seat 19 has depending from the underside thereof a block 37 of substantially the same width as the space between the bars 25 and 26, which block serves to guide the seat during adjustment of the same. The clamping member 24 is preferably formed of a metal strip having upturned side flanges 38 engaging the sides of the bars 25 and 26. Thus when it is desired to adjust the seat the wing nut 22 is loosened thereby withdrawing the clamping pressure from the member 24.

The steering frame may be of suitable construction but as shown it comprises the two strips 39 and 40 riveted together and having a hinge member 41 projecting laterally therefrom engaging between the flanges of a yoke 42, which latter in turn is riveted or otherwise secured to the end 27 of the frame. 43 is the pivot pin extending through the hinge 41 and apertured in the flanges of the yoke 42. The strips 39 and 40 diverge from each other below the hinge 41 to embrace the wheel 16 and have bearing blocks 44 for receiving the cranks 17. The upper ends of the strips 39 and 40 are also spread apart and apertured to receive the handle bar 45.

In the construction as above described the vehicle is propelled by means of the pedals 18 and it is therefore important that the seat be positioned at the proper distance from the pedals to accommodate the child using the vehicle. By the novel construction hereinbefore set forth I have provided means for quickly and easily adjusting the seat for this purpose.

What I claim as my invention is:

1. In a child's vehicle, a pair of rear wheels, a front wheel, means for connecting said wheels including a one piece frame having portions at the rear end thereof for supporting said rear wheels and terminating at the forward end in laterally spaced substantially parallel horizontal portions, pedals on said front wheel, means for steering said front wheel, a seat slidably mounted on the horizontal portions of said frame to permit adjustment of the same relative to said front wheel and means for clamping said seat in adjusted position.

2. In a child's vehicle, a front wheel supporting frame, a rear wheel supporting frame connected to the frame aforesaid and formed of a single piece of metal return bent to form laterally spaced substantially horizontally disposed portions, a seat horizontally adjustably mounted on said rear wheeled supporting frame and clamping means for securing said seat to said latter frame.

3. In a child's vehicle, a pair of rear wheels, an axle connecting said wheels, a one piece frame extending upwardly from said axle and having laterally spaced substantially horizontal bars, a forked frame pivotally connected to the forward end of said frame, a wheel journaled in said forked frame, handle bars connected to said forked frame, pedals on the last mentioned wheel, a seat slidably mounted on the horizontal bars aforesaid and means for clamping said seat to said bars.

4. In a child's vehicle, a pair of rear wheels, an axle connecting said wheels, a one piece frame for supporting said axle having two parallel bars extending forwardly therefrom in a substantially horizontal direction, a forked frame pivotally connected to the forward end of said horizontal portion, a wheel journaled in said forked frame, handle bars connected to said forked frame, pedals on the last mentioned wheel, a seat slidably mounted on said horizontal bars and means for clamping said seat to said horizontal bars.

5. In a child's vehicle, a front wheel supporting frame and a rear wheel supporting frame comprising a strip of metal bent to form two laterally spaced substantially parallel frame members pivotally connected to said front frame, a seat having a depending guiding portion between said frame members, a bolt engaging said seat and projecting between said frame members, a nut threadedly engaging said bolt and a clamping member engaging the underside of said frame members and secured by said nut.

6. In a child's vehicle, a front wheel supporting frame and a rear wheel supporting frame comprising a metal strip return bent to form two spaced parallel side portions extending horizontally between the front and rear wheels, said side portions being bent downwardly and outwardly at the rear ends thereof forming journals for the rear wheels, a seat slidably mounted on said parallel side portions and means for clamping said seat thereto.

7. In a child's vehicle, a pair of rear wheels, an axle connecting said wheels, a front steering wheel, a frame in one piece bent to form two parallel side bars extending horizontally between the front and rear wheels, said frame being pivotally connected to the front wheel, said side bars being bent downwardly and outwardly to engage said axle, a seat having a wide portion and a forwardly extending narrowed portion, a guide depending from said seat and arranged between said side bars, a bolt extending through said seat block and between said side bars, a clamp extending transversely of said side bars having laterally bent flanges embracing said bars and a nut on said bolt engaging said clamping member.

8. In a child's vehicle, a forked front frame, a driving wheel carried thereby, pedals on said wheel, handle bars on said forked frame, a one piece connecting frame bent to form two laterally spaced bars having substantially parallel portions pivotally attached to said forked frame and extending horizontally, the rear ends of said bars being bent downwardly and then outwardly, an axle secured to the outwardly bent portion, wheels on said axle and a seat having a guiding portion between the parallel portions of said side bars, said seat being adjustable on the horizontal portion of said side bars and means for clamping said seat to said side bars.

In testimony whereof I affix my signature.

JAMES C. MEYERS.